United States Patent
Yoshida et al.

(10) Patent No.: US 6,282,616 B1
(45) Date of Patent: Aug. 28, 2001

(54) CACHING MANAGING METHOD FOR NETWORK AND TERMINAL FOR DATA RETRIEVING

(75) Inventors: Kenichi Yoshida, Kitamoto; Yasuhide Mori, Hiki-gun; Norifumi Nishikawa, Amagasaki; Takafumi Hosokawa, Yao; Hiroshi Tsuji, Itami, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/136,069

(22) Filed: Aug. 19, 1998

(30) Foreign Application Priority Data

Aug. 19, 1997 (JP) .................................................... 9-222134

(51) Int. Cl.⁷ .......................... G06F 12/00; G06F 15/167; G06F 15/16
(52) U.S. Cl. .......................... 711/133; 711/134; 711/136; 711/135; 709/217; 709/203
(58) Field of Search .................................... 711/118, 136, 711/134, 135, 133; 709/217, 203

(56) References Cited

U.S. PATENT DOCUMENTS

| | | |
|---|---|---|
| 5,325,505 | 6/1994 | Hoffecker . |
| 5,829,023 * | 10/1998 | Bishop ................................. 711/118 |
| 5,884,298 * | 3/1999 | Smith, II et al. ........................ 707/2 |
| 5,893,139 * | 4/1999 | Kamiyama ........................... 711/117 |
| 5,933,853 * | 8/1999 | Takagi ................................. 711/159 |
| 5,961,602 * | 10/1999 | Thompson ........................... 709/229 |
| 5,974,509 * | 10/1999 | Berliner .............................. 711/135 |
| 6,012,126 * | 1/2000 | Aggarwal et al. .................... 711/133 |
| 6,085,234 * | 7/1998 | Pitts et al. ............................ 709/217 |

\* cited by examiner

*Primary Examiner*—Do Hyun Yoo
*Assistant Examiner*—Kimberly McLean
(74) *Attorney, Agent, or Firm*—Antonelli, Terry, Stout & Kraus, LLP

(57) ABSTRACT

With respect to a data transfer over a network, data is stored in each cache of the network and the retrieving processing following the second retrieving processing is executed by using a cache, thereby resulting in a transfer amount being decreased. Statistics information of a data transfer over the network is obtained. When transfer data is stored in a low-speed storage such as a disk, only data of high access frequency is stored and data of low access frequency is discarded, thereby solving such a problem that a speed of a disk apparatus becomes a bottleneck.

4 Claims, 6 Drawing Sheets

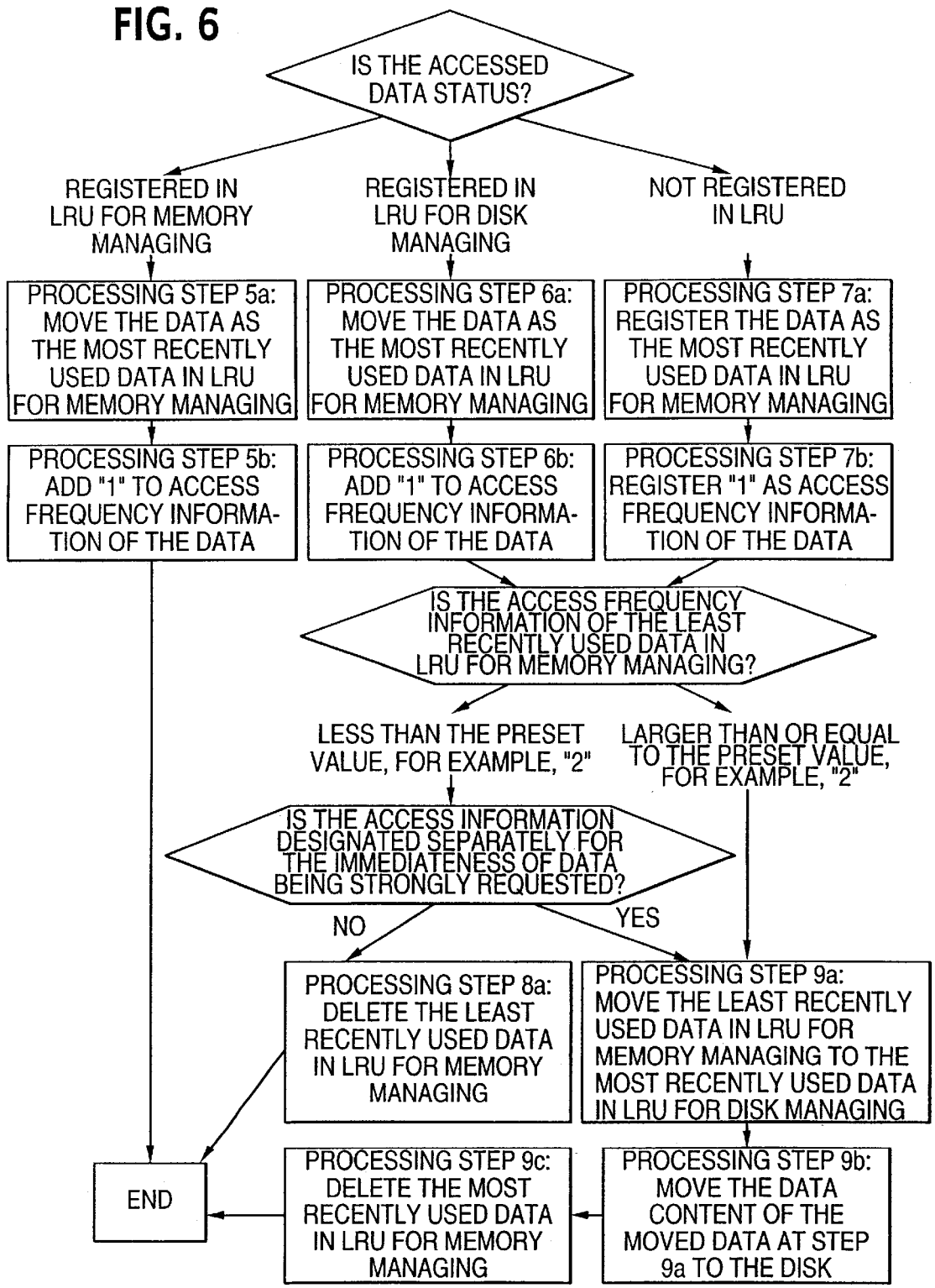

CACHING MANAGING METHOD FOR NETWORK AND TERMINAL FOR DATA RETRIEVING

BACKGROUND OF THE INVENTION

The present invention relates to a computer network and more particularly to a mechanism for managing cache contents which have heretofore been executed by a Least Recent Used (LRU) system.

A data transfer amount has heretofore been reduced by memorizing copies (hereinafter referred to as caches) of transfer data in each place of a network so as to execute the retrieval processes following the second retrieval process by using caches in proportion to an increase in the data transfer amount over a network. This cache content management has heretofore used the LRU algorithm.

When the cache content is managed by the LRU algorithm, data that cannot be stored fully in a high-speed/small capacity storage is stored in a low-speed/large capacity storage such as a disk. Further, data that cannot be stored in such a low-speed/large capacity storage, longest non-used data is discarded. That is, the latest accessed data is stored in the high-speed storage, then new data is stored in the low-speed storage, and data of longest period in which it is not in use is discarded.

SUMMARY OF THE INVENTION

According to the cache content management based on the above-mentioned LRU, it is known that the second and following accessed data is relatively satisfactorily stored in the storage. However, when the LRU algorithm management method is used as the cache control of the network data transfer based on World Wide Web (WWW), a disk apparatus of large capacity becomes necessary, and there is a problem that a speed of a disk apparatus becomes a bottleneck of the system. That is, only by the LRU algorithm, there are required many operations for transferring data from a memory serving as a high-speed storage to a disk serving as a low-speed storage. Thus, the speed of the disk apparatus becomes a bottleneck of the system performance.

An object of the present invention is to provide a cache technology which can remove a bottleneck of the speed of the disk apparatus and which can transfer network data of large capacity at a high speed.

The above-mentioned object may be attained by memorizing only data of high access frequency and by discarding data of low access frequency when statistics information of data transfer on the network is obtained and transfer data is memorized in the low-speed storage such as a disk. That is, data on the network is classified into data which is accessed at a high frequency and data which is accessed at a low frequency from a statistics standpoint. Therefore, when data is memorized in the high-speed storage under the management of the LRU algorithm, the frequency at which such data is accessed is measured. When this data is transferred to the low-speed storage under the management of the LRU algorithm, data having the high access frequency is transferred to the low-speed storage as is conventional but data having the low access frequency is not transferred to the low-speed storage and discarded. Specifically, in response to the access frequency obtained when data is initially accessed and memorized in the high-speed storage, it is determined whether or not data should be transferred to the low-speed storage under the management of the LRU algorithm.

BRIEF DESCRIPTION OF THE DRAWINGS

FIG. 6 is a diagram showing an embodiment of the present invention.

DESCRIPTIION OF THE PREFERRED EMBODIMENT

Figure 1:
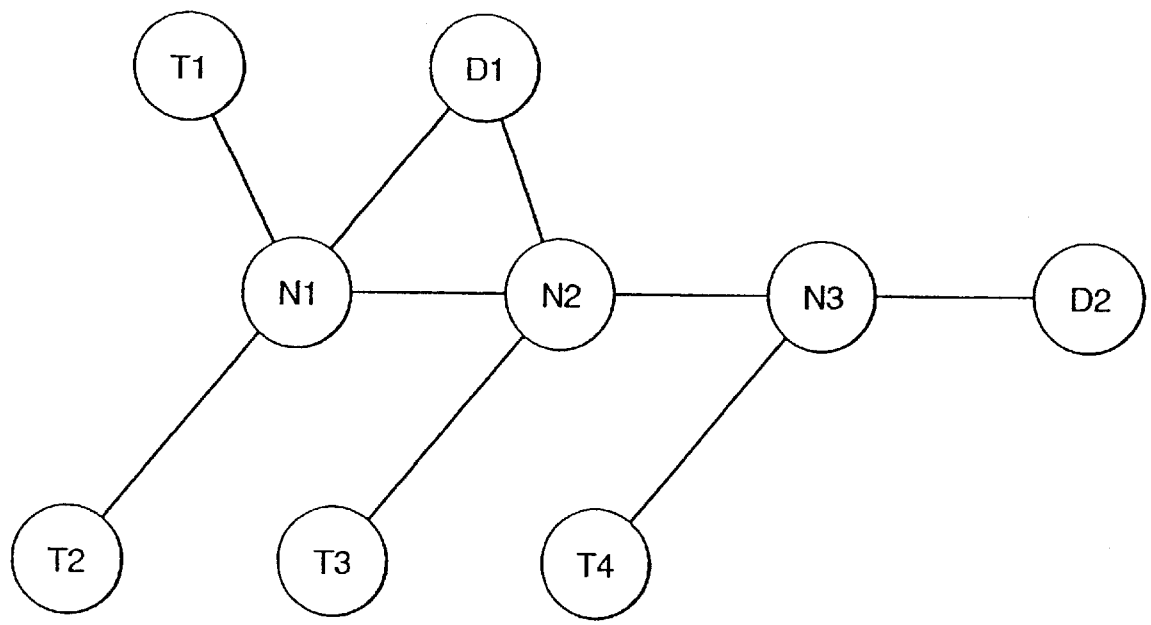
FIG. 1 is a diagram showing an example of a network to which the present invention is applied and a database distributed on the network.

FIG. 1 is a diagram showing an example of a network to which the present invention is applied and a data base distributed on the network. In FIG. 1, encircled D1, D2, designate database apparatus (ordinary computers and hereinafter referred to D or D1, D2), encircled T1, T2, T3, T4 designate data retrieving terminals (also computers and hereinafter referred to as T or T1, T2, . . . ), and encircled N1, N2, N3 designate connecting apparatus (nodes and computers and hereinafter referred to as N or N1, N2, . . . ) for connecting the computers over the network to transfer data.

Figure 2:
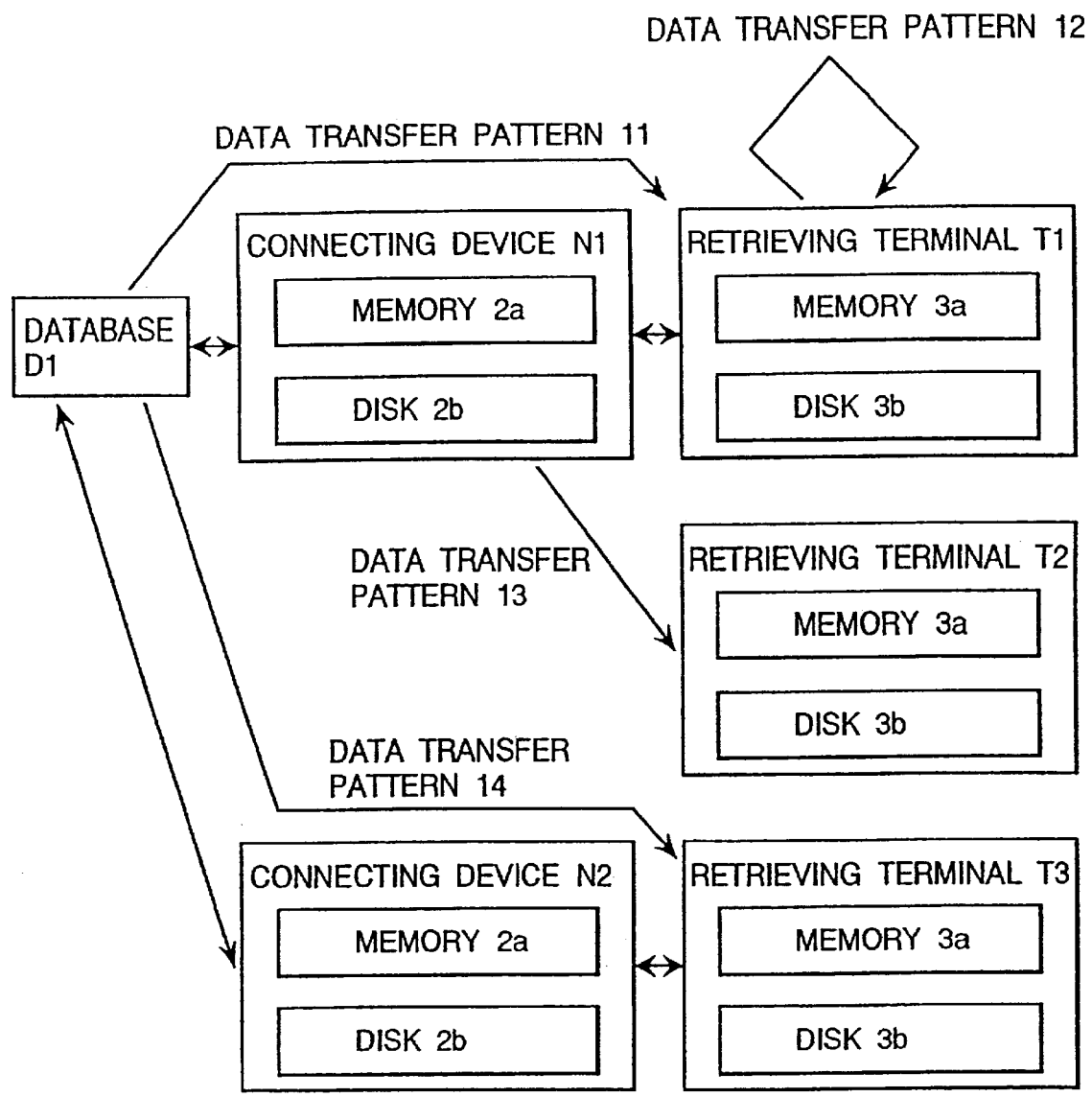
FIG. 2 is a diagram showing an example of a data transfer in the network to which the present invention is applied.

FIG. 2 is a diagram showing an example of a data transfer on the network to which the present invention is applied. In FIG. 2, the connecting apparatus N1, N2 are adapted to transfer data over the network and computers which are called caching proxy in the case of WWW. A connecting apparatus memory 2a and a connecting apparatus disk 2b are caching proxy computer memory and disk apparatus, respectively. In the case of WWW, the retrieving terminals T1, T2, T3 are computers having display software (generally called a browser). A retrieving terminal memory 3a and a retrieving terminal disk 3b are retrieving personal computer memory and disk, respectively.

In the WWW, when a user retrieves and displays data from the retrieving terminal T1, a WWW server designated as a retrieving target corresponds to the database D1, data retrieved by the user from the data memorized in the database D1 is transferred through the connection apparatus N1 to the retrieving terminal T1 (transfer pattern 11 in FIG. 2), thereby being displayed on the screen of the retrieving terminal T1. At that time, in order to reduce a data communication amount, a copy (generally called a cache) of transferred content is created and stored in the storage of the connecting apparatus N1 and the retrieving terminal T1. When the same user retrieves the same data again, the required data is obtained from the cache of the retrieving terminal T1, and displayed (transfer pattern 12). In this case, the data transfer on the network is not needed. Also, when other user who uses the same connecting apparatus N1 requests the same data by using the retrieving terminal T2, data is obtained from the cache of the connecting apparatus N1 (transfer pattern 13). In this case, data need not be transferred between the database D1 and the connecting apparatus N1. The retrieval request executed by the user who uses the connecting apparatus N2 by using the retrieving terminal T3 and the retrieval request for other data are processed by the database D1, transferred to the retrieving terminal T3 (transfer pattern 14 in FIG. 2), and then displayed on the screen of the retrieving terminal T3. In this case, since the connecting apparatus N1 is not in use, the data transfer is not reduced.

When the user requests the data retrieval by using the retrieving terminal, initially, it is checked whether or not the retrieving terminal itself has data. If the retrieving terminal itself has data, then data is used by the transfer pattern 12. If not, then it is checked whether or not data can be obtained from the cache of the connecting apparatus. If the data can be retrieved from the cache of the connecting apparatus, then data is obtained by the transfer pattern 13. If not, then the retrieval up to the database is executed and a data transfer is executed through the connecting apparatus (transfer patterns 11, 12).

Figure 3:
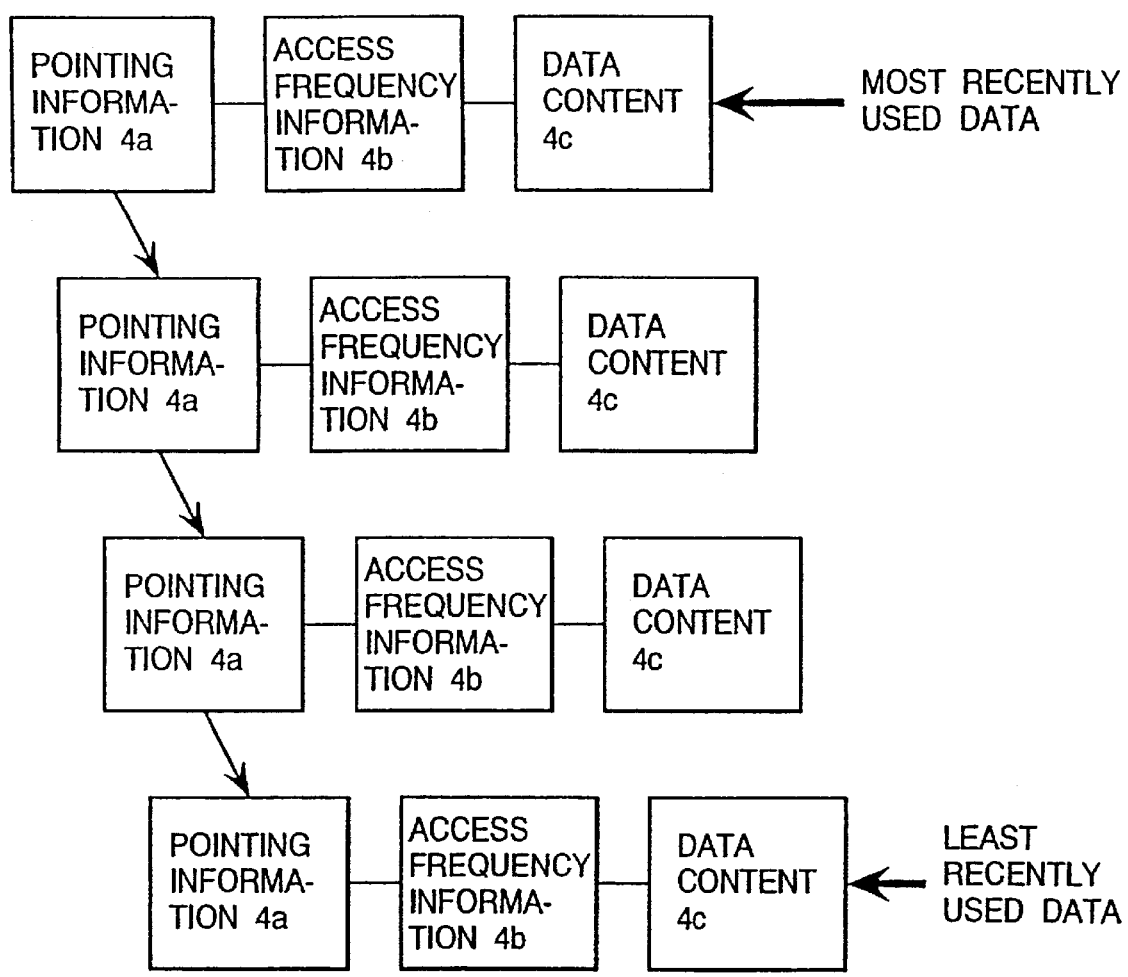
FIG. 3 is a diagram showing a specific example of a data structure used in this embodiment.
Figure 4:
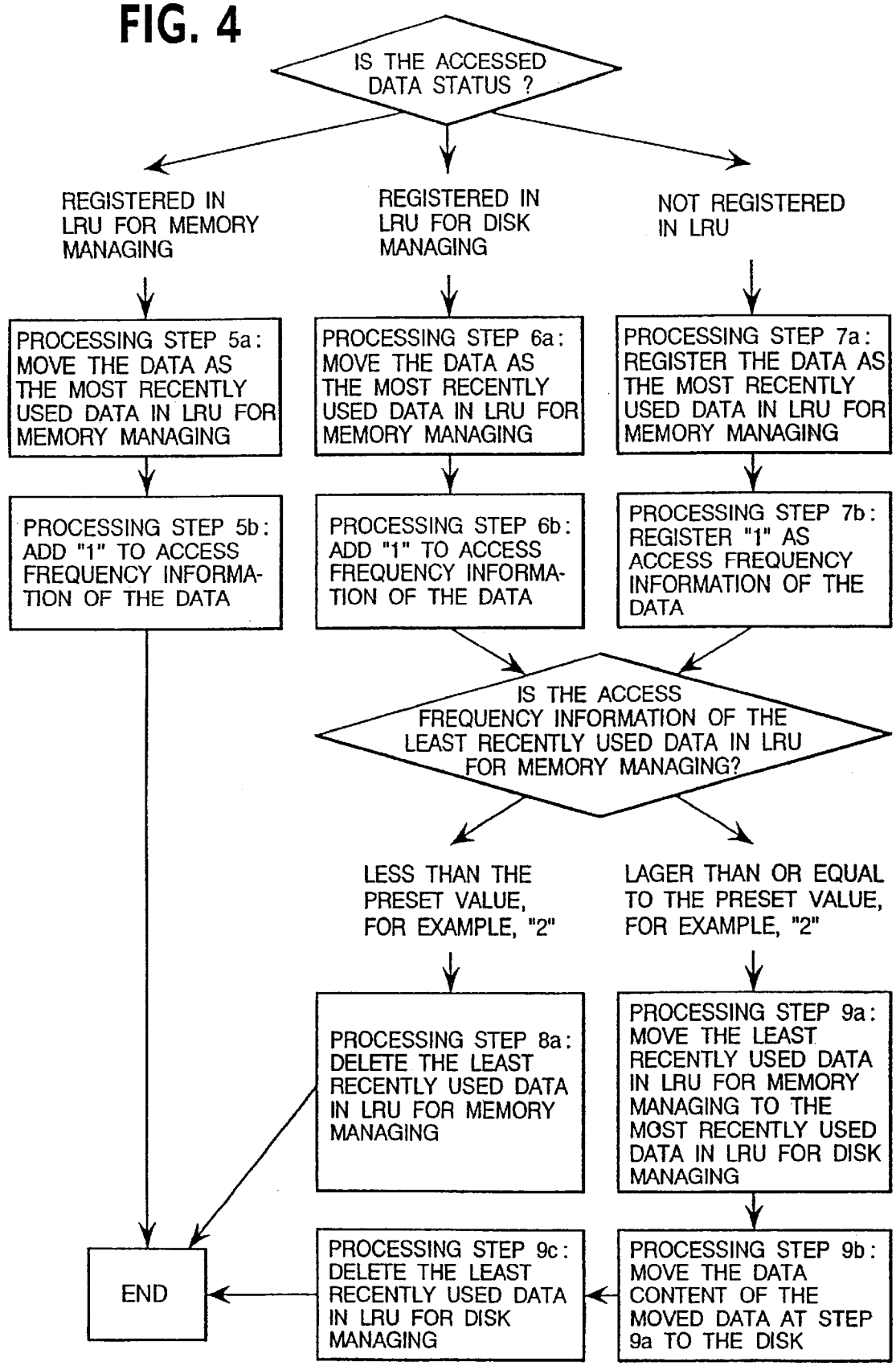
FIG. 4 is a diagram showing an embodiment of the present invention, i.e., an algorithm by which the connecting apparatus and the retrieving terminals on the network manage their cache areas on the memory and on the disk. This algorithm is an enhancement of the conventional LRU algorithm.

FIG. 4 shows an embodiment of an algorithm in which cache areas within the memory and cache areas on the disk of the retrieving terminal are managed based on the LRU algorithm. FIG. 3 shows a specific example of a data structure used in this embodiment. Data comprises pointer information 4a, frequency information 4b and data body 4c. Of these information 4a, 4b and data body 4c, the data body 4c is transferred data itself. The frequency information 4b is data essential to the embodiment of the present invention. The pointer information 4a records the movement when the data is moved to the start of the memory management LRU in response to the access of the data and the previous data located at the start is moved down to the next order, as will be described later on.

In the algorithm exemplified in FIG. 4, as long as data is stored within the memory or within the disk, the same processing as that of the conventional LRU algorithm is executed. That is, initially, it is checked whether or not the accessed data is already registered in the memory management LRU or whether or not such data is already registered in the disk management LRU or whether or not such data is not yet registered in the above two kinds of management LRUs. In response to the checked result, any one of the processings 5a, 6a, 7a is executed. Since the processing executed herein corresponds to the data access, the above data is moved to the start of the memory management LRU (5a, 6a) or registered (7a). Then, 1 is added to the memory management LRU. As a result of the fact that data which was already registered on the disk management LRU or which is not yet registered on the memory management LRU is registered on the memory management LRU, data overflows from the cache within the memory. Although such data is unconditionally moved to the cache area on the disk according to the conventional LRU algorithm, according to the present invention, it is determined in response to the access frequency of the period in which data is stored in the cache area within the memory whether or not data should be moved to the cache area on the disk. That is, frequency information of data at the end of the memory management LRU is checked. Then, only data accessed more than a predetermined number (e.g. twice) is copied to the disk area (processing 9a), and data accessed less than the predetermined number is discarded (processing 8a).

Since data transferred on the network such as WWW is classified to provide data which is accessed at a high frequency and data which is accessed at a low frequency, when data is memorized in the high-speed storage by the LRU algorithm as described above, the access frequency is predicted. According to the LRU algorithm, when data is transferred to the low-speed storage, the data which is accessed at a low frequency is not transferred to the low-speed storage but discarded, thereby making it possible to reduce the number of the disk access.

Figure 5:
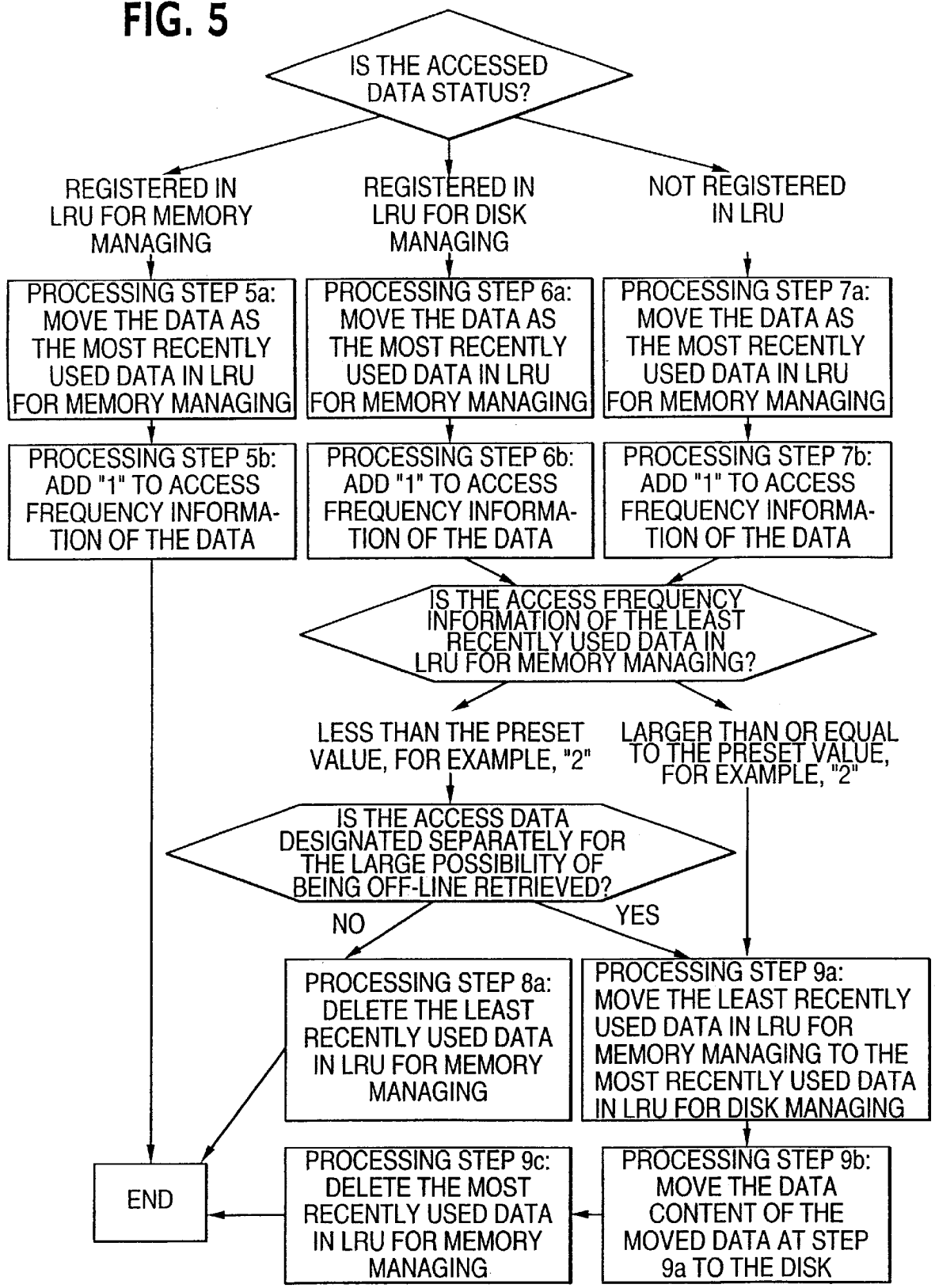
FIG. 5 is a diagram showing an embodiment of the present invention.

In the above-mentioned embodiment, it is determined based on the access frequency whether or not data should be memorized in the disk. However, recently, mobile environment is taken seriously. Therefore, it is frequently observed that the retrieving terminal 3 is detached from the network and an off-line retrieval is executed. In this case, with respect to the cache management of the retrieving terminal 3, in addition to the standard memorized in the disk based on the frequency shown in FIG. 4, data having the large possibility of being off-line retrieved on the way may be designated separately, and even if the designated data is low in access frequency, such designated data may be memorized in the disk. The data which is accessed by on-line and the data which is accessed by off-line are different in character and kind, and the data which is accessed by off-line may have a low access frequency. In such cases, without considering the mobile environment and off-line access for the data, such off-line accessed data will be discarded as the data of low access frequency. To prevent such accident, this method of this invention is useful. FIG. 5 shows an embodiment of an algorithm similar to the FIG. 4 embodiment and additionally includes a block for determining whether the access data is designated separately for the large possibility of being retrieved off-line.

Further, there are data of the kind whose immediateness is strongly requested. Such data also may be designated separately. Even when such designated data is low in access frequency, such data may be memorized in the cache. FIG. 6 shows an embodiment of an algorithm similar to the FIG. 4 embodiment and additionally includes a block for determining whether the access information designated separately for the immediateness of data is being strongly requested.

While the data structure of the memory management LRU and the data structure of the disk management LRU are also similarly illustrated in FIG. 3 for simplifying the description as described above, the frequency information 4b is not needed in the disk management LRU structure and may be omitted.

According to the present invention, it is possible to provide a cache technology in which the bottleneck of the speed of the disk apparatus can be removed and in which the network data of large capacity can be transferred at a high speed.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. In a cache management method applied to a network system comprising a plurality of database apparatus, a plurality of retrieving terminals for retrieving data and a plurality of connecting apparatus for connecting the plurality of database apparatus and the retrieving terminals through a network including a low-speed storage and a high-speed storage, said connecting apparatus relays a data transfer on said network and stores the data in said high-speed storage, wherein when a data amount stored in said high-speed storage exceeds a storage capacity of said high-speed storage, the cache management method of said connecting apparatus allows transfer of data from said high-speed storage to said low-speed storage, and only data that satisfies a predetermined standard is transferred from said high-speed storage to said low-speed storage, wherein said standard corresponds to access frequency information of said data to be transferred, and only data that is greater than a constant number is transferred from said high-speed storage to said low-speed storage, wherein said standard includes that data to be transferred is designated separately for a large possibility of being retrieved off-line even though access frequency information of said data to be transferred is less than said constant number.

2. In a cache management method applied to a network system comprising a plurality of database apparatus, a plurality of retrieving terminals for retrieving data and a plurality of connecting apparatus for connecting the plurality of database apparatus and the retrieving terminals through a network including a low-speed storage and a high-speed storage, said connecting apparatus relays a data transfer on said network and stores the data in said high-speed storage, wherein when a data amount stored in said high-speed storage exceeds a storage capacity of said high-speed storage, the cache management method of said connecting apparatus allows transfer of data from said high-speed storage to said low-speed storage, and only data that satisfies a predetermined standard is transferred from said high-speed storage to said low-speed storage, wherein said standard corresponds to access frequency information of said data to be transferred, and only data that is greater than a constant number is transferred from said high-speed storage to said low-speed storage, and said standard is that data to be transferred is designated separately for an immediateness of said data being strongly requested even though access frequency information of said data to be transferred is less than said constant number.

3. In a cache management method applied to a network system comprising a plurality of database apparatus, a plurality of retrieving terminals for retrieving data including a low-speed storage and a high-speed storage and a plurality of connecting apparatus for connecting said plurality of database apparatus and said retrieving terminal through a network, said retrieving terminal obtains data from said network and stores the data in said high-speed storage, wherein when an amount of data stored in said high-speed storage exceeds a storage capacity of said high-speed storage, then the cache management method of said retrieving terminals allows transfer of data from said high-speed storage to said low-speed storage, and only data that satisfies a predetermined standard is transferred from said high-speed storage to said low-speed storage, wherein said standard corresponds to access frequency information of said data to be transferred, and only data that is greater than a constant number is transferred from said high-speed storage to said low-speed storage, wherein said standard includes that data to be transferred is designated separately for a large possibility of being retrieved off-line even though access frequency information of said data to be transferred is less than said constant number.

4. In a cache management method applied to a network system comprising a plurality of database apparatus, a plurality of retrieving terminals for retrieving data including a low-speed storage and a high-speed storage and a plurality of connecting apparatus for connecting said plurality of database apparatus and said retrieving terminal through a network, said retrieving terminal obtains data from said network and stores the data in said high-speed storage, wherein when an amount of data stored in said high-speed storage exceeds a storage capacity of said high-speed storage, then the cache management method of said retrieving terminals allows transfer of data from said high-speed storage to said low-speed storage, and only data that satisfies a predetermined standard is transferred from said high-speed storage to said low-speed storage, wherein said standard corresponds to access frequency information of said data to be transferred, and only data that is greater than a constant number is transferred from said high-speed storage to said low-speed storage, and said standard is that data to be transferred is designated separately for an immediateness of said data being strongly requested even though access frequency information of said data to be transferred is less than said constant number.

* * * * *